United States Patent [19]

Ota

[11] Patent Number: 5,216,590
[45] Date of Patent: Jun. 1, 1993

[54] CONTACTLESS GUIDED POSITIONING TABLE

[75] Inventor: Masato Ota, Narashino, Japan

[73] Assignee: Seiko Seiki Kabushiki Kaisha, Japan

[21] Appl. No.: 553,757

[22] Filed: Jul. 13, 1990

[51] Int. Cl.⁵ .................. G05B 19/18; H02K 7/09
[52] U.S. Cl. ................. 364/167.01; 310/90.5
[58] Field of Search ............. 364/474.16, 167.01; 310/90.5, 13, 312; 324/200–210

[56] References Cited

U.S. PATENT DOCUMENTS

| | | | |
|---|---|---|---|
| 4,387,935 | 6/1983 | Studer | 310/90.5 |
| 4,885,491 | 12/1989 | Hiyamn et al. | 310/90.5 |
| 4,985,651 | 1/1991 | Chitaynt | 310/12 |
| 5,013,987 | 5/1991 | Wakui | 310/90.5 |
| 5,027,280 | 5/1991 | Ando et al. | 364/474.16 |
| 5,160,877 | 11/1992 | Fujiwara et al. | 310/90.5 |

Primary Examiner—Jerry Smith
Assistant Examiner—Jim Trammell
Attorney, Agent, or Firm—Bruce L. Adams; Van C. Wilks

[57] ABSTRACT

A contactless guided positioning table has a table body and a movable mount having five-axis control magnetic bearings for supporting the table body movably in a horizontal direction. A contactless linear motor horizontally drives the table body. A vacuum container contains the movable mount movably in a direction vertical to the moving direction of the table body. A coupling member is disposed through a flexible hollow member to secure a vacuum state of the vacuum container and couples the movable mount to an external driver. A controller controls the electric current applied to the magnetic bearings. There is no mechanical contact, such as a sliding guide face and ball screw motor, used in the movement of the table body, thereby preventing dust from being generated by friction due to direct contact. Further, the table does not require lubricating oil which would disadvantageously affect normal operation in a vacuum and effectively avoids deposition and removal of solids.

7 Claims, 4 Drawing Sheets

CONTACTLESS GUIDED POSITIONING TABLE

BACKGROUND OF THE INVENTION

The present invention relates to a contactless guided positioning table utilized in various types of precision machining apparatus, precision measurement apparatus and biotechnological apparatus.

The positioning table is used, for example, in a precision working apparatus for producing a circuit pattern of semiconductor device. In such case, the positioning table carries a semiconductor substrate and a mask in an exposure instrument which uses ultraviolet radiation for optically transferring a micro-fine image of the mask having a desired pattern onto the semiconductor substrate covered by a photosensitive material. The table is provided with a guide and a driver. For example, sliding guide face and ball screw motor drive can be used for coarse displacement, and elastic support piezoelectric element, contactless air bearing face, or linear motor can be used for fine displacement.

A precision apparatus, such as semiconductor circuit pattern exposure apparatus, requires positioning accuracy and parallel alignment accuracy on the order of 0.01 μm. In order to prevent contamination by dusts and to avoid physical and chemical degradation of a substrate and photosensitive material, the table must be operated within a high vacuum. However, in the prior art, when the sliding guide face and ball screw motor drive are used for guiding and driving of the positioning table, dusts or chips may be generated due to direct contact among metal material such as steel and non-metal material such as plastics. Further, deposition and removal of solids may be caused since lubricating oil cannot be used in vacuum.

When using the conventional contactless air bearing face, serious damage or destruction of instruments and products could not be avoided due to power supply failure, break down, leak or accident. Further, the conventional positioning table requires various addtional means for securing a desired positioning accuracy and parallel alignement accuracy.

SUMMARY OF THE INVENTION

An object of the present invention is to provide a positioning table having no mechanical contact. The inventive contactless guided positioning table is comprised of a table body, a movable mount having five-axis control magnetic bearings for supporting the table body displaceably in a horizontal direction and having a contactless linear motor for horizontally driving the table body. A vacuum container is provided for containing the movable mount displaceably in a direction vertical to the displacing direction of the table body. A link member disposed through a flexible hollow member is provided and is effective to maintain a vacuum state for coupling the movable mount to an external driver, and a controller is provided for controlling electric current applied to the magnetic bearings.

In positioning and parallel adjustment of the table body in X-, Y- and Z-axis directions, firstly Y-axis position adjustment electromagnets and Z-axis position adjustment electromagnets of the five-axis control magnetic bearings are controlled and excited by the controller such that the table body is placed in a floating state within a cavity of the movable mount.

Coarse positioning in the X-axis direction is carried out by the horizontal-drive contactless linear motor. When the horizontal-drive contactless linear motor is controlled by the operation of the controller, the floating table body is displaced in the X-axis direction to a given position within the cavity or enclosed space of the movable mount to thereby effect the coarse positioning.

Coarse positioning in the Y-axis direction is carried out by the external driver. When the external driver is actuated under control of the controller, the movable mount is displaced in the Y-axis direction to a given position within the vacuum container so that the table body supported in the movable mount is coarsely positioned in the Y-axis direction.

Fine positioning in the X-axis direction is carried out by operation of known drive means such as a combination of piezoelectric elements and elastic members. When the drive means is operated under the control by the controller, the table body undergoes a desired micro-displacement in the X-axis direction. Accordingly, the table body can be finely positioned in the X-axis direction relative to the movable mount within the enclosed space.

Fine positioning in the Y-axis direction is effected by the Y-axis position adjustment electromagnets of the five-axis control magnetic bearings. When the Y-axis electromagnets are operated under control of the controller, the table body undergoes a desired micro-displacement in the Y-axis direction due to electric current difference, i.e., magnetic force difference between the opposed Y-axis electromagnets. Accordingly, the table body is finely positioned in the Y-axis direction relative to the movable mount within the enclosed space.

Fine positioning in the Z-axis direction is carried out by the Z-axis position adjustment electromagnets of the five-axis control magnetic bearings. When the Z-axis electromagnets are operated under control by the controller, the table body undergoes a desired micro-displacement in the Z-axis direction due to electric current difference, i.e., magnetic force difference between the opposed Z-axis electromagnets. Accordingly, the table body can be finely positioned in the Z-axis direction relative to the movable mount within the enclosed space.

The parallel alignment of the table body is effected by angular positionings around respective one of the X-axis, Y-axis and Z-axis. The angular or rolling positioning around the X-axis is carried out by the Z-axis position control adjustment electromagnets. When the Z-axis electromagnets are operated under control of the controller, the table body undergoes a given micro-displacement in the Z-axis direction due to electric current difference, i.e., magnetic force difference between the opposed Z-axis electromagnets. In addition, the electromagnet currents are controlled such that upper and lower sections of the table body are displaced in opposite directions relative to each other. Accordingly, the table body can be finely angularly positioned around the X-axis relative to the movable mount within the enclosed space.

Angular or yaw positioning around the Y-axis is carried out also by the Z-axis position adjustment electromagnets. When the Z-axis electromagnets are operated under control of the controller, the table body undergoes a given micro-displacement in the Z-axis direction due to electric current difference, i.e., magnetic force difference between the opposed Z-axis electromagnets. In addition, the electromagnet currents are controlled such that left and right sections of the table body with respect to its center line along the X-axis are displaced oppositely with each other. Consequently, the table body can be finely and angularly positioned around the Y-axis within the enclosed space and relative to the movable mount.

Angular or pitching positioning around the Z-axis is effected by the Y-axis position adjustment electromagnets. When the Y-axis electromagnets are operated under control of the controller, the table body undergoes a given micro-displacement in the Y-axis direction due to electric current difference, i.e., magnetic force difference between the opposed Y-axis electromagnets. In addition, the electromagnet currents are controlled such that left and right sections of the table body with respect to its center line along the X-axis are displaced in opposite directions relative to each other. Consequently, the table body can be finely angularly positioned around the Z-axis within the enclosed space and relative to the movable mount.

DETAILED DESCRIPTION OF THE INVENTION

Figure 1:
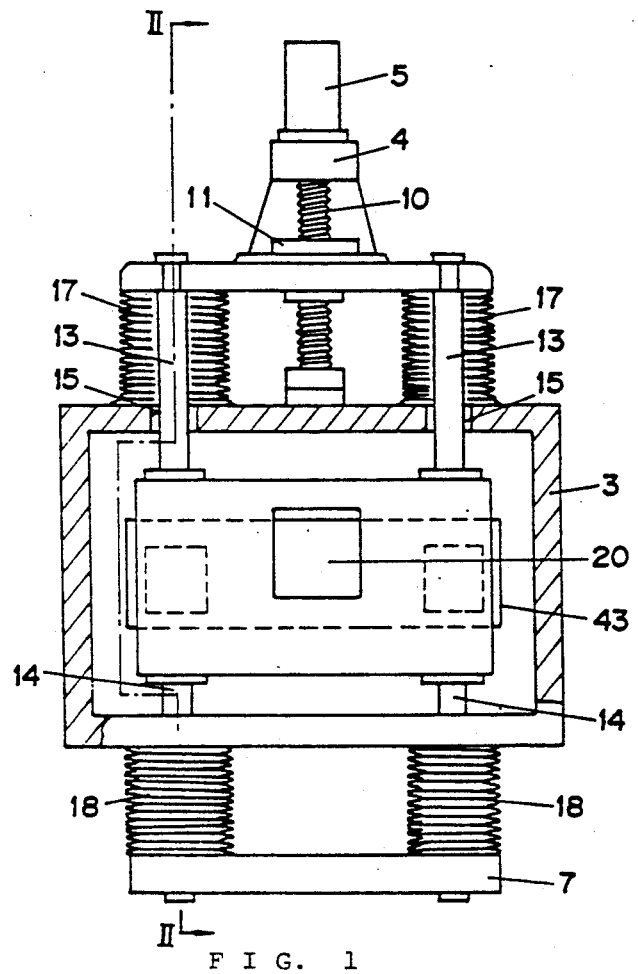
FIG. 1 is a partially sectional front view showing an embodiment of the inventive contactless guided positioning table.
Figure 2:
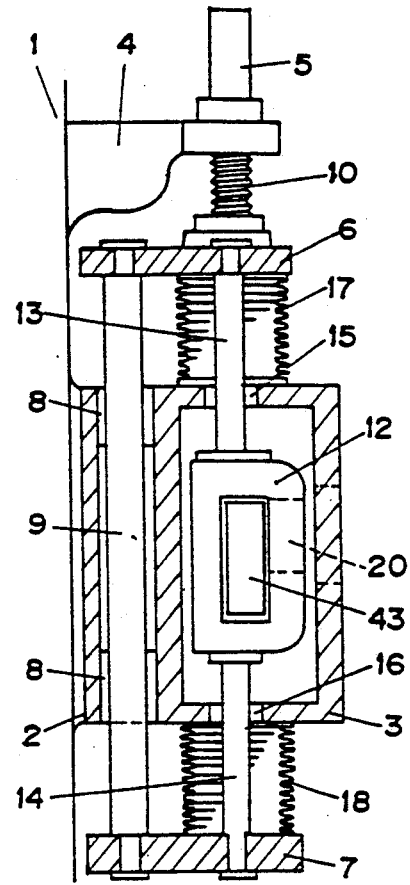
FIG. 2 is a sectional view taken along line II—II shown in FIG. 1.
Figure 3:
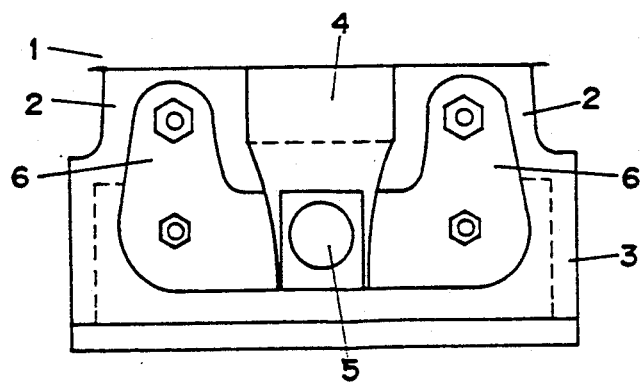
FIG. 3 is a plan view of the embodiment of the inventive contactless guided positioning table.
Figure 4:
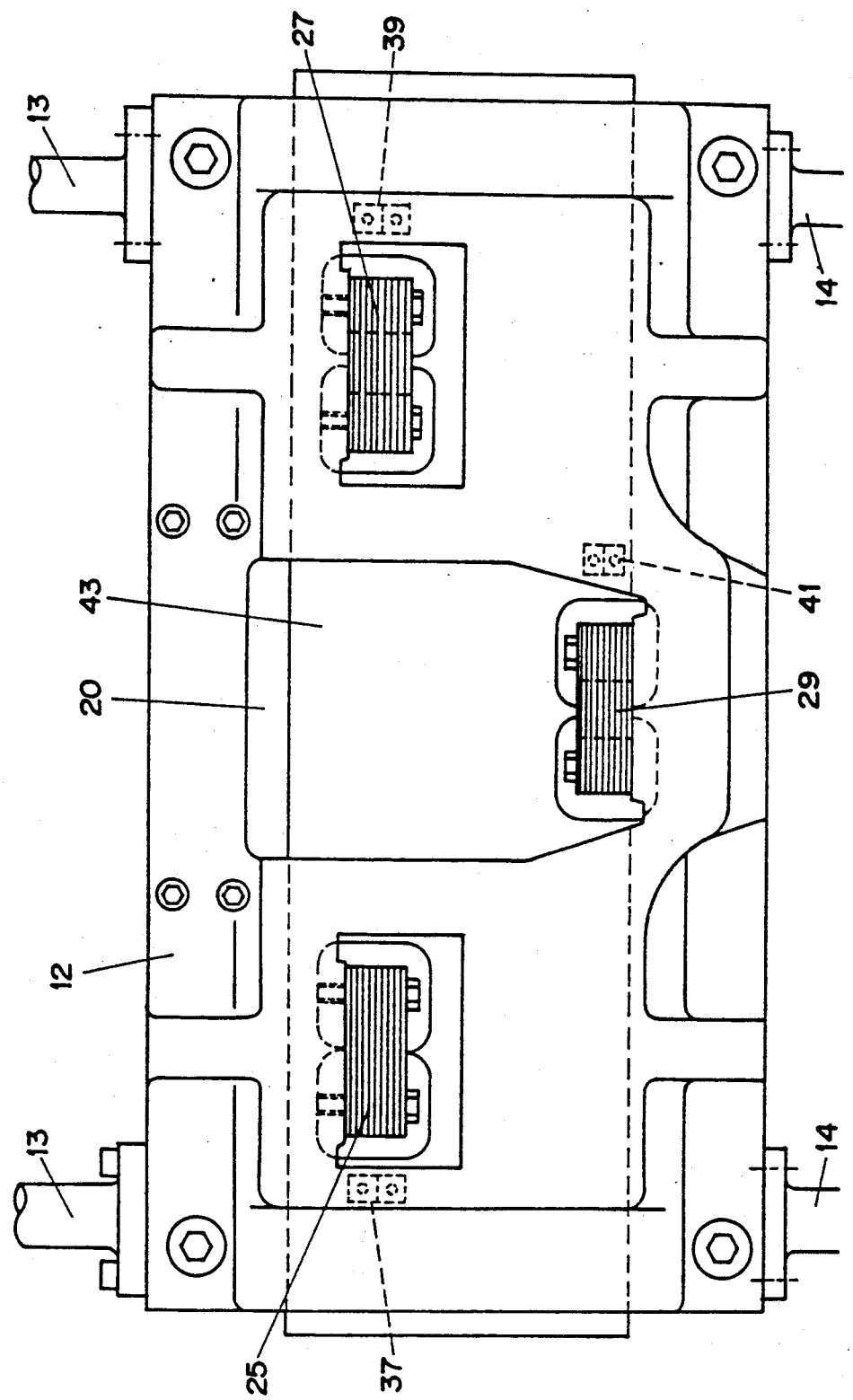
FIG. 4 is a front view showing an elevator provided in the embodiment of the inventive contactless guided positioning table.
Figure 5:
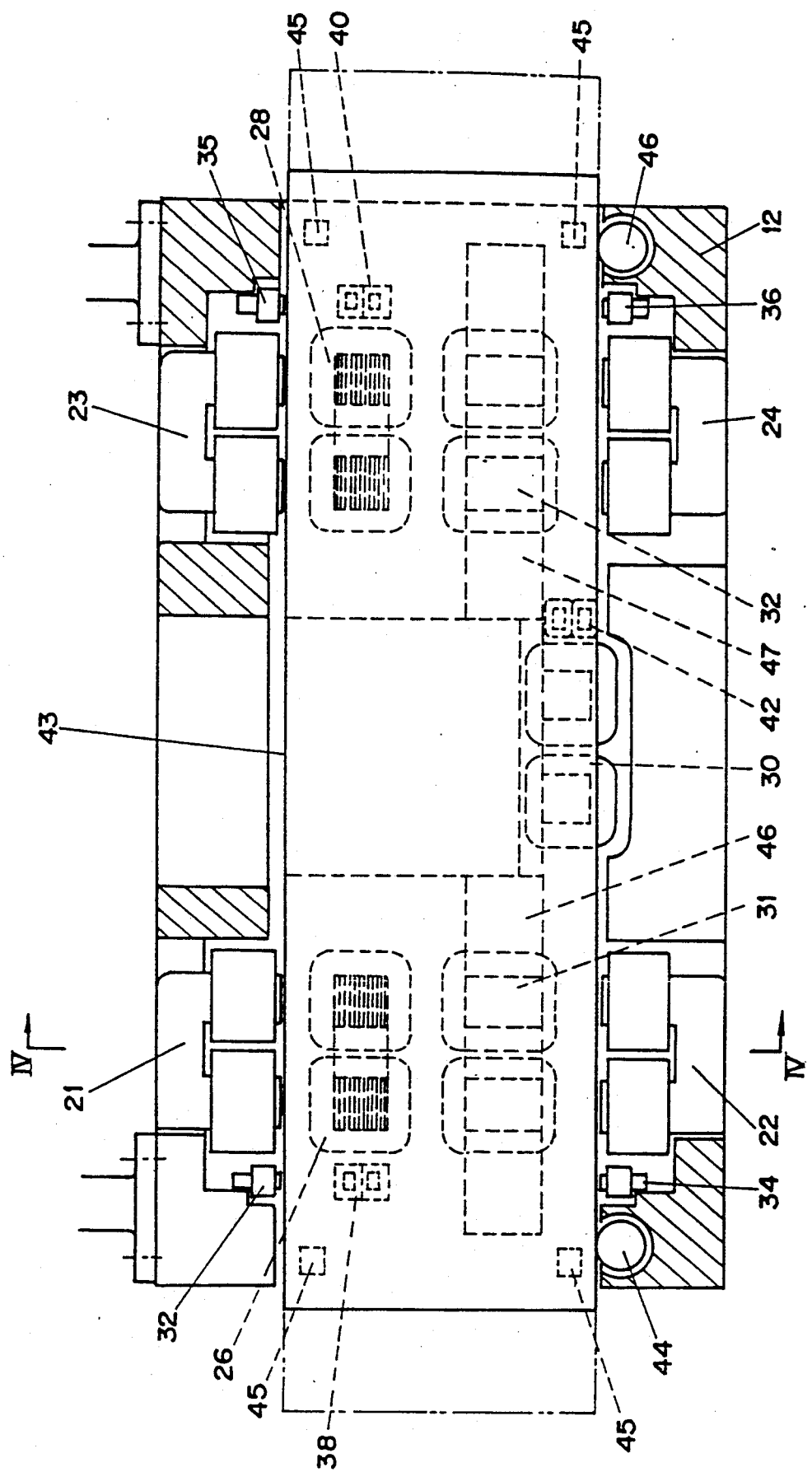
FIG. 5 is a sectional front view of the embodiment of the inventive contactless guided positioning table.

Embodiments of the invention will be described in conjunction with the drawings. The drawings show an embodiment of a contactless guided positioning table of the type applicable to a semiconductor circuit pattern exposure apparatus. The semiconductor circuit pattern exposure apparatus generally uses exposure radiation in the ultraviolet range having wavelength of 200 Å–400 Å. Alternatively, X-ray radiation having a wavelength of several Å may be used, and the powerful X-ray radiation is composed of synchrotron radiation emitted horizontally. Therefore, the contactless guided positioning table must be of the vertical type where the table body undergoes displacement along a vertical plane as shown in the Figures. In FIG. 1, the X-axis is determined to extend, the Y-axis extends upward to downward, and the Z-axis extends normal to the drawing paper.

As shown in the Figures, a vacuum container 3 is attached to a side of a frame 1 through a connecting member 2. A servo motor 5 is mounted on an upper face of a protrusion 4 which extends from the same side of the frame 1 over the vaccum container 3. An upper apron 6 is disposed between an upper face of the vacuum container 3 and the protrusion 4, and a lower apron 7 is disposed under a lower face of the vaccum container 3. The aprons 6 and 7 are integrally coupled through a pair of parallel guide rods 9, 9 which pass through the connecting member 2 in the vertical direction and which are vertically slideably supported by a pair of sliding contact bearings 8, 8.

A feeding screw 10 is coupled to a shaft end of the servo motor 5 controlled by the controller (not shown). The screw 10 extends downward and engages with a female screw 11 provided in a center of the upper apron 6, and a bottom end of the feeding screw 10 is connected to the upper face of the vacuum container 3 such as to be allowed free rotation.

An elevator 12 is disposed inside the vacuum container 3 so as to leave a space at least upward and downward. The elevator 12 is connected at its upper face to the bottom face of the upper apron 6 through a pair of parallel upper support rods 13, 13 which pass through the upper wall of the vaccum container 3. The elevator 12 is also connected at its lower face to the top face of the lower apron 7 through another pair of parallel lower support rods 14, 14 which extend through the lower wall of the vacuum container 3 such that the elevator 12 is united to the pair of upper and lower aprons 6 and 7. The upper and lower support rods 13, 13 and 14, 14 are inserted, respectively, into opening holes 15, 15 and 16, 16 formed through the upper and lower walls of the vacuum container 3, leaving an allowance or gap. Bellows 17, 17; 18, 18 are attached to enclose respective ones of the support rods 13, 13; 14, 14 and to connect between the bottom face of the upper apron 6 and the upper face of the vacuum container 3 and between the top face of the lower apron 7 and the lower face of the vacuum container 3. Accordingly, the opening holes 15, 15 and 16, 16 are closed by the bellows 17, 17 and 18, 18 the bottom face of the upper apron 6, and the top face of the lower apron 7 to thereby secure the vaccum state of the vacuum container 3.

Figure 6:
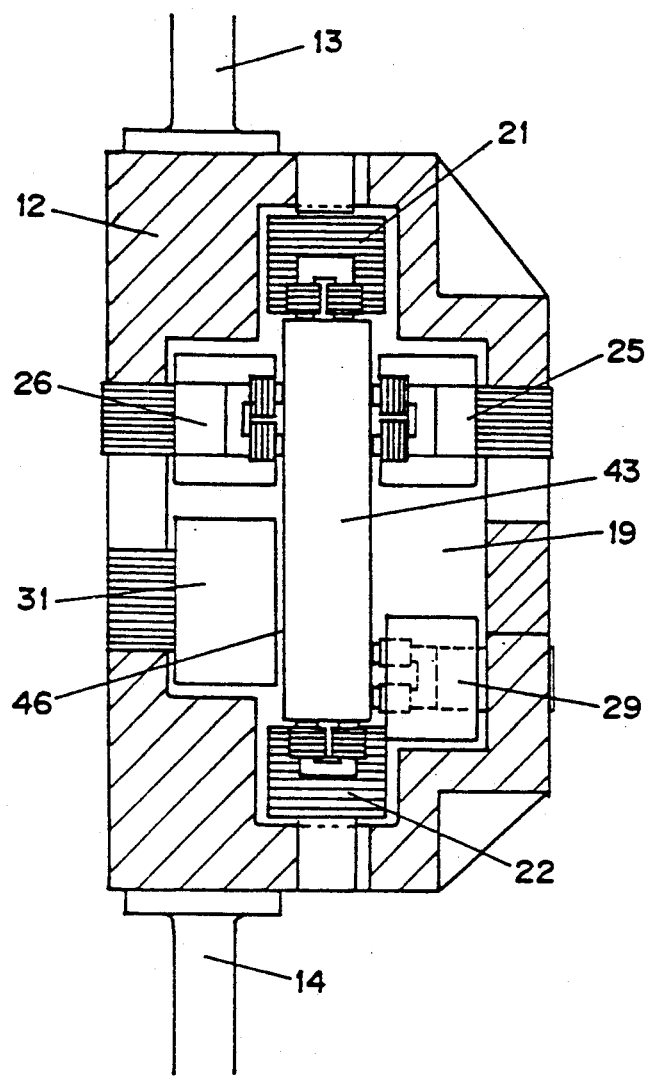
FIG. 6 is a sectional view taken along line VI—VI indicated in FIG. 5.

The elevator 12 is composed of a frame formed with a space or cavity 19 which extends in the X-axis direction and which has a sectional shape as shown in FIG. 6. The elevator 12 is further formed with a rectangular exposure window 20 in a center of a front wall thereof.

Y-axis position adjustment electromagnets 21, 22 are provided on leftward upper and lower sections of an inner peripheral surface of the cavity 19, and other Y-axis position adjustment electromagnets 23, 24 are provided on rightward upper and lower sections of the inner peripheral surface of the cavity. The electromagnets 21, 22 are opposed, respectively, to the electromagnets 23, 24. Z-axis position adjustment electromagnets 25, 26 are disposed on front and rear sections of the left upper side. Other Z-axis position adjustment electromagnets 27, 28 are disposed on front and rear sections of right upper side, and still other Z-axis position adjustment electromagnets 29, 30 are provided on front and rear sections of central lower side in opposed relation to each other, respectively. Further, a pair of linear pulse motors 31, 32 are provided, respectively, on rear face lower side of left and right inner peripheral surfaces of the cavity 19. The linear pulse motors 31, 32 could be replaced by a positioning element of the feedback control type composed in combination of a regular optical scale and a voice coil motor.

Y-axis position detection sensors 33, 34, 35, 36 are provided adjacent to the respective one of the Y-axis position adjustment electromagnets 21, 22, 23, 24. Z-axis position detection sensors 37, 38, 39, 40, 41, 42 are provided adjacent to the respective one of the Z-axis position adjustment electromagnets 25, 26, 27, 28, 29, 30.

A table body 43 of a rectangular plate is disposed vertically in the cavity 19 such that upper, lower, front and rear face sections of the table body 43 are opposed in alignment to magnetic poles of the respective electromagnets 21–30, to the respective position sensors 31–42 and to magnetic poles of the linear pulse motors 31, 32. Further, protection bearings 44 are provided on both side ends of the lower face of the cavity 19. Other protection bearings 45 are provided on upper and lower of both sides of the front and rear faces. The protection bearings 44 are of the rolling-contact type, while the other protection bearings 45 may be of the sliding-contact type.

Magnetic poles of the linear pulse motors 31, 32 and counter magnetic pole sections 46, 47 of the table body 43 are formed in a comb shape aligned to each other in the X-axis direction. The respective opposed pairs of electromagnets and the respective pairs of position sensors adjacent to the corresponding electromagnets are connected to the controller of the power supply of the magnetic poles as shown in FIG. 7.

Figure 7:
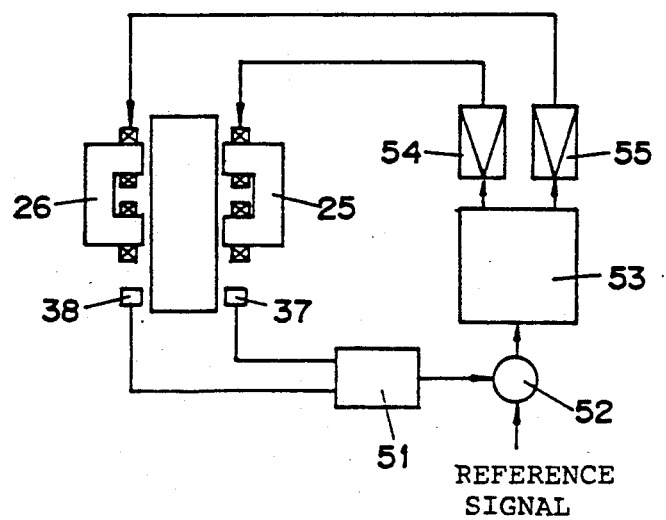
FIG. 7 is a control circuit diagram of electromagnets provided in the embodiment of the inventive contactless guided positioning table.

FIG. 7 shows the arrangement of an opposed pair of electromagnets and position sensors adjacent thereto, typically for example, electromagnets 25, 26 and sensors 37, 38. One of the pair of position sensors 37, 38 may be eliminated to simplify the arrangement.

The respective position sensors 37, 38 are connected to a sensor signal processor 51 such that a detection signal is converted into a voltage level signal which can be treated by a controller 53 of PID operation type. The sensor signal processor 51 is connected to the controller 53 through a comparator 52 to which a reference signal is inputted. The controller 53 of PID operation type is connected such that its output is inputted into coils of the respective electromagnets 25, 26 through corresponding amplifier 54, 55.

Further, a piezoelectric element and an elastic member are interposed between the table body 43 and the elevator 12 such that the piezoelectric element is biased in the X-axis direction by the external controller and the elastic member is biased in the reverse direction. The table body 43 can be micro-displaced in the X-axis direction by cooperative operation of these elements.

Though not shown in the Figure, it can be readily understood that various connections are provided, without hindering sealing of the vacuum container 3, between the vacuum container 3 and a vacuum pump, between the controller and the respective electromagnets, position sensors and piezoelectric element, and between the linear pulse motor and a power supply.

The next description is given for the operation of the contactless guided positioning table. In the positioning table used in a semiconductor circuit pattern exposure apparatus, a semiconductor substrate is mounted on the table body 43 and is exposed through a mask to an X-ray which enters through the exposure window 20.

In such a case, the table body 43 together with the semiconductor substrate is accurately positioned in the X-, Y- and Z-axis directions on the order of 0.01 $\mu$m and its parallel alignment is adjusted. At first, the respective Y-axis position adjustment electromagnets 21, 22, 23, 24 and respective Z-axis position adjustment electromagnets 25, 26, 27, 28, 29, 30 are excited in response to inputs from the controller so that the table body 43 is placed in a floating state within the cavity 18 of the elevator 12.

Coarse adjustment in the X-axis direction is effected by the operation of linear pulse motors 31, 32. When the linear pulse motors 31, 32 are operated under control by the controller (not shown), the floating table body 43 is displaced in the X-axis direction to a given position within the cavity 19 of the elevator 12 so as to effect the coarse positioning.

Coarse positioning in the Y-axis direction is carried out by operation of the servo motor 5. When the servo motor 5 is operated under control by the controller (not shown), the feeding screw 10 is rotationally driven such that the upper apron 6 moves upward or downward through the engagement between the female screw 11 and the feeding screw 10. Consequently, the elevator 12 united to the upper apron 6 through the upper support rod 13 is displaced in the Y-axis direction to a given position within the vacuum container 3 while being guided by the guide rod 9 through the sliding-contact bearings 8, 8. As a result, the table body 43 is coarsely positioned in the Y-axis direction within the elevator 12. Meanwhile, coarse positioning may not be necessary in the Z-axis direction.

Fine positioning in the X-axis direction is carried out by cooperation of the piezoelectric element and elastic member (not shown). When the piezoelectric element is operated under control of the controller, the table body 43 undergoes micro-displacement in the X-axis direction due to deformation of the piezoelectric element in response to a control voltage while the table body 43 is pressed by the piezoelectric element and the corresponding elastic member in opposite directions. Accordingly, the table body 43 is finely positioned in the desired X-axis position within the cavity relative to the elevator 12.

Fine adjustment in the Y-axis direction is carried out by the Y-axis position adjustment electromagnets 21, 22 and 23, 24. When the respective electromagnets 21, 22 and 23, 24 are operated under control of the controller, the table body 43 undergoes micro-displacement in the Y-axis direction due to coil current difference, i.e., magnetic force difference between the pair of electromagnets 21, 23 and the other pair of electromagnets 22, 24. At this time, the position of the table body 43 is detected relative to the elevator 12 by means of the Y-axis position detection sensors 33, 34 and 35, 36. Their detection signal is inputted through the sensor signal processor 51 into the comparator 52, and is compared with a predetermined reference value. The controller 53 operates to control electric currents flowing through the Y-axis position adjustment electromagnets 21, 22 and 23, 24 so as to equalize the detection signal to the reference value. Accordingly, the table body 43 is finely positioned in the desired Y-axis direction within the enclosed space and relative to the elevator 12.

Fine positioning in the Z-axis direction is carried out by the Z-axis position adjustment electromagnets 25, 26; 27, 28 and 29, 30. When the respective Z-axis position adjustment electromagnets 25, 26 and 27, 28; 29, 30 are operated under control of the controller, the table body 43 undergoes micro-displacement in the Z-axis direction according to coil current difference, i.e., magnetic force difference between the electromagnets 25, 27, 29 and the electromagnets 26, 28, 30. Concurrently, the position of the table body 43 is detected relative to the elevator 12 by means of the Z-axis position detection sensors 37, 38 and 39, 40; 41, 42, and their detection signal is fed through the sensor signal processor 51 to the comparator 52 for comparison with a predetermined reference value. The controller 53 operates to control electric currents flowing through the Z-axis position adjustment electromagnets 25, 26 and 27, 28; 29, 30 so as to equalize the detection signal to the reference value. Accordingly, the table body 43 is finely positioned in the desired Z-axis direction within the enclosed space and relative to the elevator 12.

Parallel alignment of the table body 43 is carried out according to angular positionings around the X-axis, Y-axis and Z-axis. The angular or rolling positioning around the X-axis is carried out by the Z-axis position adjustment electromagnets 25, 26 and 27, 28; 29, 30. When the electromagnets 25, 26 and 27, 28; 29, 30 are operated under control of the controller, the table body 43 undergoes angular micro-displacement around the X-axis due to coil current difference, i.e., magnetic force difference between the electromagnets 25, 27, 30 and the other electromagnets 26, 28, 29. Concurrently, the position of the table 43 is detected relative to the elevator 12 by means of the Z-axis position detection sensors 37, 38 and 39, 40; 41, 42, and their detection signals are inputted through the sensor signal processor 51 into the comparator 52 for the comparison with a predetermined reference value. The controller 53 operates to control electric currents flowing through the Z-axis position adjustment electromagnets 25, 26 and 27, 28; 29, 30 so as to equalize the detection signal to the reference value. Accordingly, the table body 43 is finely angularly positioned around the desired X-axis.

The angular or yaw positioning around the Y-axis is also effected by the Z-axis position adjustment electromagnets 25, 26 and 27, 28. When the respective electromagnets 25, 26 and 27, 28 are operated under control of the controller, the table body 43 undergoes angular micro-displacement around the Y-axis due to coil current difference, i.e., magnetic force difference between the electromagnets 25, 28 and the other electromagnets 26, 27. Concurrently, the position of the table body 43 is detected relative to the elevator 12 by means of the Z-axis position detection sensor 37, 38 and 39, 40, and their detection signals are fed through the sensor signal processor 51 to the comparator 52 for comparison with a predetermined reference value. The controller 53 operates to control electric currents flowing through the Z-axis position adjustment electromagnets 25, 26 and 27, 28 so as to equalize the detection signal to the reference value. Accordingly, the table body 43 can be finely and angularly positioned around the desired Y-axis within the enclosed space and relative to the elevator 12.

The angular or pitching positioning around the Z-axis is carried out by the Y-axis position adjustment electromagnets 21, 22; 23, 24. When the respective electromagnets 21, 22; 23, 24 are operated under control by the controller, the table body 43 undergoes angular micro-displacement around the Z-axis due to coil current difference, i.e., magnetic force difference between the electromagnets 21, 24 and the other electromagnets 22, 23. Concurrently, the position of the table body is detected relative to the elevator 12 by means of the Y-axis position detection sensors 33, 34 and 35, 36, and their detection signals are fed through the senser signal processor 51 to the comparator 52 for comparison with a predetermined reference value. The controller 53 controls electric currents flowing through the Y-axis position adjustment electromagnets 21, 22 and 23, 24 so as to equalize the detection signal to the reference value. Accordingly, the table body 43 can be finely and angularly positioned around the desired Z-axis within the enclosed space and relative to the elevator 12.

During the course of nonoperation, or when the excitation of the electromagnets is interrupted due to accident, the table body 43 may fall from the floating state. However, in such case, the table body 43 can be supported by the protection bearings 44 prior to at least contact with the Y-axis position adjustment electromagnets 22, 24, thereby avoiding destruction of the Y-axis position adjustment electromagnets 21, 24. Further, when the table body 43 is concurrently declined, the table body 43 can be supported by the protection bearings 45 prior to at least contact with the Z-axis position adjustment electromagnets 37-42, thereby avoiding destruction of the Z-axis position adjustment electromagnets 37-42.

The above described embodiment is of the vertical type where the table body 43 is vertically supported within a movable mount, i.e., the elevator 12 which undergoes up-and down movement. Such contactless guided table of the vertical type can be applied to a semiconductor circuit pattern exposure apparatus. On the other hand, a horizontal type may be constructed for use in various types of precision machining apparatuses, precision measurement apparatuses and biotecnological apparatuses, such that the table body 43 is disposed horizontally and a movable mount is displaced in the horizontal direction by manner similar to the elevator 12. Namely, the horizontal type has construction obtained by rotation of the vertical type around the X-axis by 90°. In such case, the protection bearings 44 which are disposed within the cavity 19 of the vertical type may be also provided on an opposed face, and the other protection bearings 45 may be disposed on a single lower face. In addition, the protection bearings 44 may be composed of sliding-contact type, and the protection bearings 45 are composed of a rolling-contact type.

In the inventive contactless guided positioning table, a workpiece can be displaced within a vaccum. Moreover, there is no mechanical contact such as sliding guide face and ball screw motor during the course of the movement and displacement, thereby preventing generation of dusts which would be caused due to friction by direct contact. Further, the inventive table can eliminate use of lubricating oil which would affect operation in a vacuum, and can eliminate generation of deposition and removal of solids. In addition, since magnetic bearings are utilized for supporting, linear micro-displacement in the respective axis directions and angular micro-displacement around the respective axes can be effected soley by magnetic control, thereby facilitating fine adjustment of the table in the respective axis directions and fine parallel alignment thereof without addition of bulky members.

What is claimed is:
1. A contactless guided positioning table comprising:
a table body;
a movable mount having five-axis control magnetic bearings for controlling translational positions of the table body along X, Y and Z axes and rotational positions of the table body around the X and Y axes, and for supporting the table body movably in a horizontal direction and having a contactless linear motor for driving the table body horizontally;
a vacuum container containing therein the movable mount movably in a direction vertical to a moving direction of the table body;

means including a flexible hollow member for obtaining a vacuum state within the vacuum container;

a coupling member disposed through the flexible hollow member for coupling the movable mount to an external driver; and a controller for controlling electric current applied to the magnetic bearings.

2. A contactless guided positioning table, comprising: a table body; a movable mount movably supporting the table body and including magnetic bearings for supporting the table body by a magnetic field without contacting the table body; controlling means for controlling an electric current applied to the magnetic bearings to thereby control the magnetic field to effect fine positioning of the table body in at least one direction; contactless driving means comprising a contactless linear motor for driving the table body to effect coarse positioning in a first direction; and external driving means including an external driver in operable contact with the movable mount for driving the movable mount to effect a coarse positioning in a second direction.

3. A contactless guided positioning table according to claim 2; wherein the magnetic bearings comprise five-axis magnetic bearings effective to control translational positions of the table body along X, Y and Z axes and rotational positions of the table body around the X axis and Y axis.

4. A contactless guided positioning table according to claim 2; further comprising a vacuum container containing therein the movable mount.

5. A contactless guided positioning table according to claim 4; further comprising a flexible hollow member for obtaining a vacuum state within the vacuum container; and a coupling member disposed through the flexible hollow member for coupling the movable mount to the external driver.

6. A contactless guided positioning table according to claim 2; further comprising at least one piezoelectric element and at least one elastic member in operable contact with the table body for effecting fine positioning in the first direction.

7. A contactless guided positioning table according to claim 2; further comprising protection bearing means effective for protecting the table body to prevent contact thereof with the magnetic bearings.

* * * * *